United States Patent [19]

Crankshaw

[11] Patent Number: 4,955,769
[45] Date of Patent: Sep. 11, 1990

[54] GEAR COUPLING AND HUB

[75] Inventor: John H. Crankshaw, Erie, Pa.

[73] Assignee: Dynetics, Inc., Erie, Pa.

[21] Appl. No.: 389,527

[22] Filed: Aug. 4, 1989

Related U.S. Application Data

[62] Division of Ser. No. 211,865, Jun. 27, 1988, Pat. No. 4,872,791.

[51] Int. Cl.$^5$ .......................... B23F 1/00; F16D 3/18
[52] U.S. Cl. ...................... 409/12; 464/159; 409/51
[58] Field of Search ............... 409/12, 10, 26, 32, 409/33, 29, 34, 51; 51/26, 287; 464/158, 159, 154, 156

[56] References Cited

U.S. PATENT DOCUMENTS 3,142,972  8/1964  Spaulding, Jr. .................. 464/159

FOREIGN PATENT DOCUMENTS

| 503061 | 2/1976 | U.S.S.R. | 464/159 |
| 1034857 | 8/1983 | U.S.S.R. | 409/10 |
| 1161291 | 6/1985 | U.S.S.R. | 409/32 |
| 1216470 | 3/1986 | U.S.S.R. | 464/159 |
| 1291312 | 2/1987 | U.S.S.R. | 409/12 |

Primary Examiner—William Briggs
Attorney, Agent, or Firm—Charles L. Lovercheck; Wayne L. Lovercheck; Dale Lovercheck

[57] ABSTRACT

A gear hub for flexible gear couplings wherein the teeth of said hub are cut while the hub is being moved constantly through all of the positions that the hub would assume relative to the sleeve during operation with the hub shaft misaligned with the sleeve at the maximum angle of misalignment for which the coupling is designed.

3 Claims, 4 Drawing Sheets

GEAR COUPLING AND HUB

REFERENCE TO PRIOR APPLICATION

The present invention is a division of U.S. patent application Ser. No. 211,865 filed June 27, 1988, U.S. Pat. No. 4,872,791.

BACKGROUND OF THE INVENTION

The present invention relates to fixture for forming a hub for a gear type coupling wherein the contacting surfaces of the teeth that are in meshing engagement are crowned to minimize interference between mating teeth during operation.

Gear type misalignment couplings having crowned teeth are use in normal service to transmit mechanical power from one rotating shaft to another where such shafts are not in exact alignment. This type of coupling often comprises a cylindrical hub mounted on one of the shafts, the hub having external teeth formed on its outer peripheral surface which are in meshing engagement with mating internal teeth on the interior surface of a sleeve that is connected to the other of the misaligned shafts by means of another, similar cylindrical hub.

The sleeve is rotatable about its axis while the hubs and their shafts are rotatable about their own axes but may be misaligned with the axis of the sleeve, either angularly or in parallel offset relationship. The external teeth on the hub may not only slide axially with respect to the sleeve teeth but also roll on the internal sleeve teeth in a manner determined by the curvature of the crowned teeth and the angle of misalignment to which the mesh is subjected. Moreover, coupling hub teeth engage the sleeve teeth along a complex pattern as a given hub tooth proceeds through its orbit of operation and this complexity increases as the angle of misalignment increases. There may be apparent positions of abnormal stress on each tooth of a hub even when finished as described in U.S. Pat. No. 3,125,838 to Crankshaw et al.

Such couplings may be quite large when they are used on ships for transmitting power from the drive shaft to the propeller shaft at relatively low speeds. Smaller couplings may also be used where misalignment angles and/or speeds are high. These couplings must be able to transmit high torques between the shafts and must also be quiet in operation.

It is desirable to have as large a combined area of tooth contact as possible at any operating misalingment angle to transmit torque between the teeth of a hub and a sleeve so as to reduce contact stress to a minimum. This is especially difficult in a gear coupling when the shafts connected thereto become misaligned laterally or angularly. At least one of the members of the coupling must therefore be so constructed that there is bearing and rocking tooth contact for the transmission of torque between a maximum number of the teeth of the coupling, when the shafts are misaligned, to reduce backlash and minimize heavy stresses on individual teeth. This arrangement permits the coupling to operate at a greater degree of misalignment of the shafts, it eliminates vibration and noise, and it permits the use of higher speeds and torque.

Gears have, over the years, been manufactured by one of the following methods:

1. Milling: This is done on a conventional milling machine using a cutter shaped in accordance with the space to be produced between teeth. One tooth is cut as a time, and the work is indexed for each successive tooth. For spur gear teeth the axis of the work is always at 90 degrees to the axis of the cutter and the work does not rotate except while being indexed between cuts.

2. Hobbing: In the hobbing process the hob looks not unlike a threaded member, or worm wheel, with gashes cut parallel to the shaft axis to produce the necessary cutting edges. Both hob and work rotate simultaneously in fixed angular speed relationship. For straight spur teeth the axis of rotation of the hob is tilted appropriately with the axis of the work to compensate for the axial pitch of the hob teeth. The axis of the work is maintained parallel to the direction of motion of the hob.

3. Shaping: In the shaping process the cutter is similar to a section of a small pinion, and simultaneously rotates slowly on its axis and reciprocates rapidly in a direction parallel to its axis. The work rotates in fixed speed relationship with the rotation of the cutter. The cutter is first fed into the work radially to its proper depth, and the teeth are generated as the cutter and work revolve.

4. Grinding: Wherein a grinding wheel is substituted for the cutter in one or more of the above processes.

Note that in all of the above methods the final tooth is straight sided in an axial direction. Detailed descriptions of these processes are contained in many books on gearing such as "Gear Cutting Practice: by Colvin & Standley, McGraw-Hill Book Company, Inc. A Treatise on Gear Design for Transmissions was published by Botstiber and Kingston in "Machine Design", Dec. 1952, pp. 130 to 160.

REFERENCE TO PRIOR ART

When the desirability of using crowned teeth became apparent in coupling design, the methods described above were modified in the manner suggested by the following U.S. Patents:

Milling - U.S. Pat. No. 2,303,813 to Barcus. Hobbing - U.S. Pat. No. 2,315,068 to Matthews and U.S. Pat. No. 2,473,709 to Hitchcock. Shaping - U.S. Pat. No. 2,035,434 to Loewus (in one place only). Modifying - U.S. Pat. No. 2,682,760 to Shenk. Finishing - U.S. Pat. No. 3,125,838 to Crankshaw. U.S. Pat. No. 2,035,171 to Loewus. U.S. Pat. No. 2,744,449 to Belden et al. U.S. Pat. No. 2,922,294 to Wildhaber.

In all of these cases, the designer attempted to impose on the work, his concept of what the final tooth shape should be.

STATEMENT OF THE INVENTION

In the disclosure herein, by means of a special fixture applied to a conventional hobber shaper, grinder or other machine, a hub that has been first rough machined with straight teeth will be so modified as to produce a tooth form that is self-generated as to form, and optimal for maximum contact at any given operating condition. The hub and cutter are moved relative to each other in a manner simulating the relative movement of a hub and sleeve when operating at misalignment. This allows the sleeve (cutter) teeth to remove stock from the hub teeth in only the location and amount required to permit operation of the parts at the desired misalignement angle. Teeth made in this manner for a given torque will have substantially lower compressive stresses and backlash, but more importantly, would be easier to lubricate.

This disclosure sets forth a method for forming crowned teeth on gears for flexible couplings wherein the blank on which the hub teeth are formed is moved relative to the forming tool in a path which presents the teeth being cut in all positions that it will see, relative to its mating sleeve teeth, in service.

In the examples shown, the new method is related to hobbing and shaping but it could be carried out by milling, grinding and othe methods, as shown by the attached drawing. To get the right tooth form requires that the work be presented to the cutter at all angles of attack that it will experience in service. Thus, if the hob is fed slowly and constantly in a vertical direction, the hob teeth travel in such a manner that the locus of all positions becomes, in effect, a coupling sleeve. If the work is mounted on a spherical seat and continuously tilted to all possible positions experienced in service, the hob will cut the hub teeth as necessary to accommodate this motion. The work is so positioned by offsetting a control arm on a control disc to the degree necessary to meet the angular misalignment desired. As the hob rotates, and the work rotates on its own vertical axis in the required timed relationship, the work is also tilted through all possible angles by the rotation of the control disc. Thus, the hub teeth will be formed to the exact shape required.

This method is especially suitable to production methods, since all motions are automatic and once set up with the proper adjustment, all the operator has to do is replace blanks as they are completed.

OBJECTS OF THE INVENTION

It is an object of the invention to provide an improved gear tooth form, which is self generated to the shape dictated by the relative motions of the teeth themselves, rather than to some arbitrary shape assumed as being proper by the equipment designer.

Another object of the invention is to provide a gear coupling which will have teeth self formed by moving the tooth being cut relative to the forming cutter through all of the angles that the coupling would experience during operation in service.

Another object is to provide an improved gear coupling having maximum total contact area at all times.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
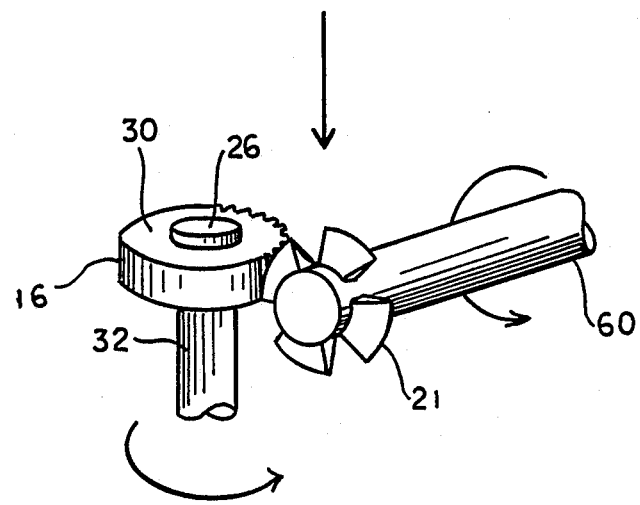
FIG. 1 is an enlarged isometric schematic view of a gear hobbing machine of a type well known to the art of gear manufacture.
Figure 2:
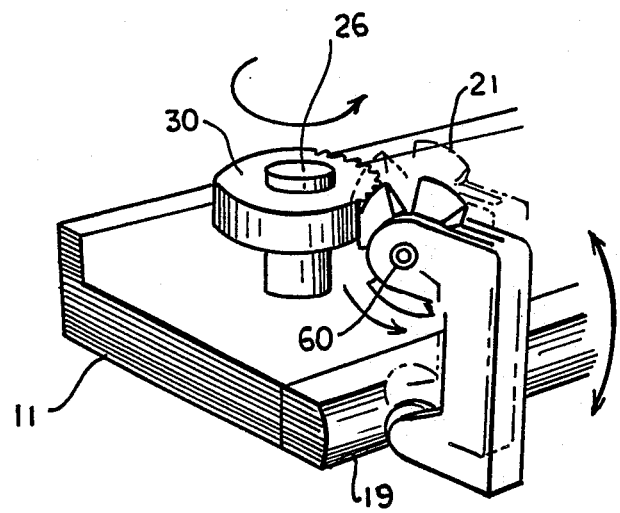
FIG. 2 is an enlarged isometric schematic view of the machine shown in FIG. 1, with a cam attachment applied to generate a tooth crown according to the prior art.
Figure 3:
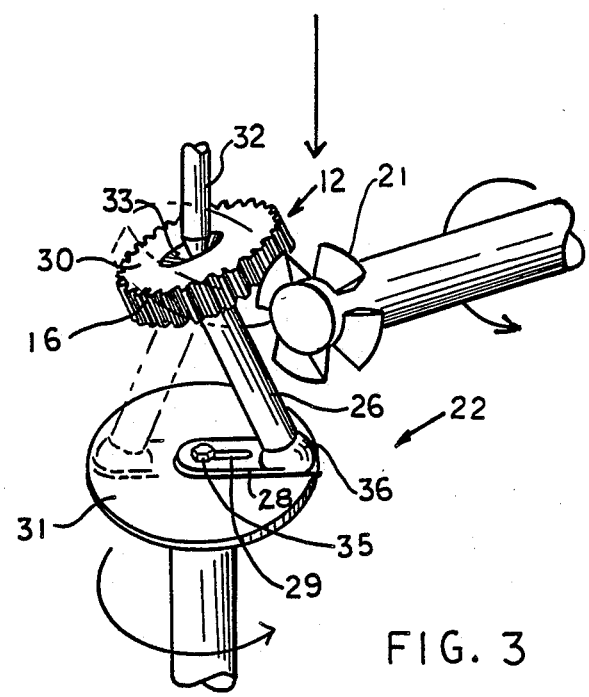
FIG. 3 is a schematic view similar to FIG. 1 of a gear hobbing machine of a well known type, modified with an oscillating shaft to illustrate the relative movement of the blank and the cutter according to the invention.
Figure 4:
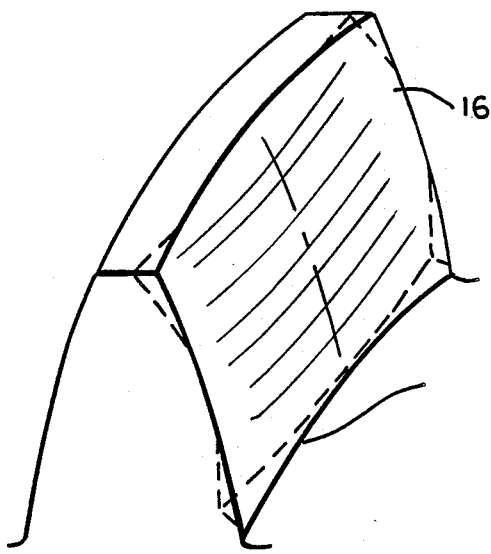
FIG. 4 is an isometric schematic view of a tooth of a gear coupling modified according to the invention. Note that the pressure angle varies from that of the hob cutter at mid plane, to pregressively different pressure angles as contact moves from mid plane to either end of the tooth.

Now with more particular reference to the drawings, FIG. 1 schematically shows a hob cutter 21 on a hob shaft 60 and a gear blank 30 supported on a work shaft 32. FIG. 2 shows blank 30 on shaft 26 carried by table 11 equipped with a cam 19 which controls the radial movement of the cutter as it moves vertically. FIG. 3 schematically shows the movement of the gear blank 30 relative to the hob cutter 21 with the shaft 26 oscillated by control disc assembly 22, illustrating the movement of the gear blank in the adapters of FIGS. 5 and 6.

Figure 5:
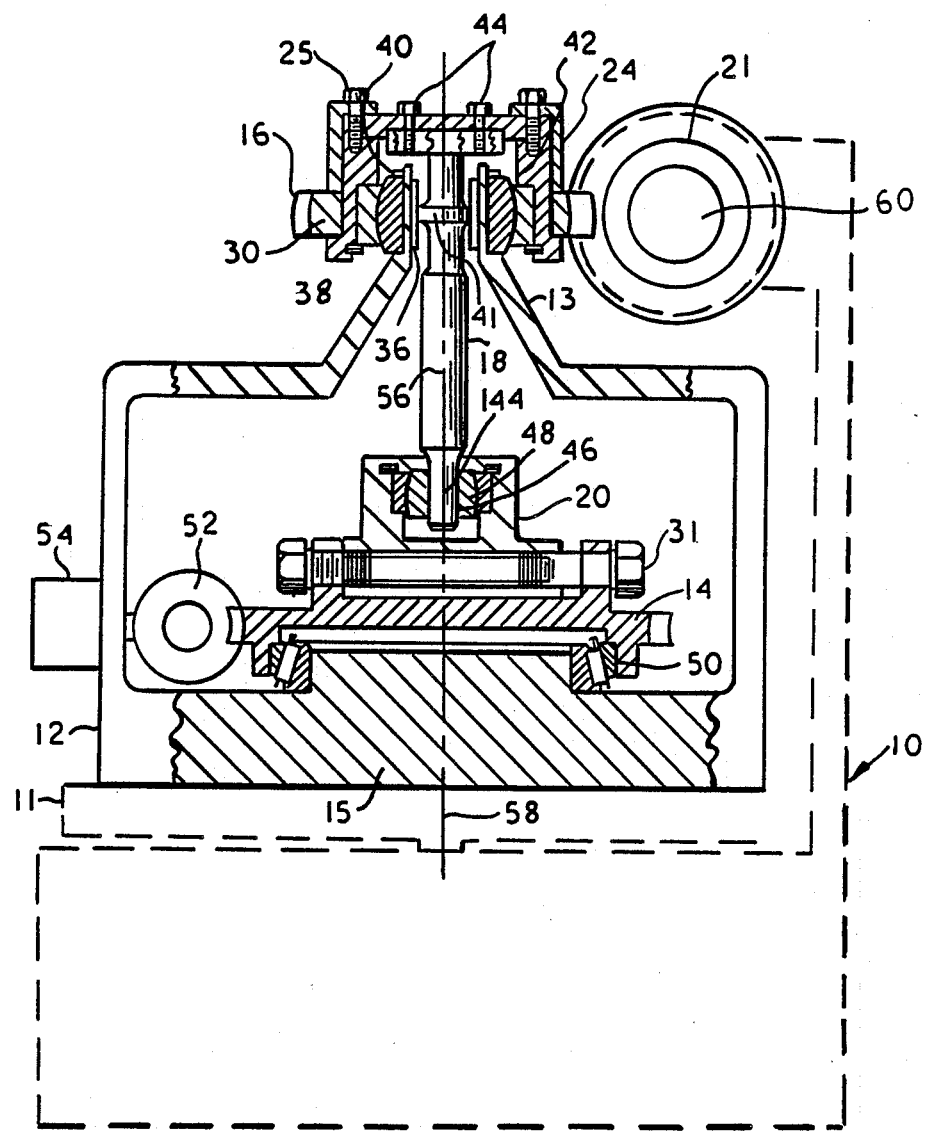
FIG. 5 is a view partly in cross section of an example of an attachment for a gear cutting machine equipped with an adapter to manufacture couplings according to the invention, with the control shaft of the adapter set for a zero misalignment design (e.g. to cut straight spur toothed gears).

Now particularly, referring to FIG. 5, gear cutting machine 10 has a frame with rotary table 11 on which attachment 12 is supported. Attachment 12 is designed to simulate movement of teeth on a gear hub of a flexible coupling which is to operate with a gear sleeve, such as hub blank 16, shown in FIGS. 3, 5 and 6. Attachment 12 is intended to be supported on the rotatable work table 11 of machine 10. Upper bearing support 13 and lower bearing support 15 are a part of the attachment frame. Control disc 14 is rotatably supported on lower bearing support 15 by means of Timken bearing 50. Control disc 14 has external teeth that are engaged by control disc drive wheel 52 which is driven by motor 54. Lower bracket 20 is slidable and adjustable laterally on control disc 14 by means of adjusting bolt 31.

Upper bearing support 13 supports upper ball joint 38 having its spherical center at 40. Center 40 of upper ball joint 38 is coincident with center line 56 of control shaft 18. The outer member of the upper ball joint 38 is received in an inverted cup shaped member 42. Hub blank 30 is clamped to inverted cup 42 by clamp 24 and cap screws 25. The inverted cup 42 is secured to control shaft 18 by cap screws 44.

The structure supporting upper bearing support 13 is joined to lower base 15 as a single fabricated assembly 12 to be mounted on machine table 11. Hence, upper bearing support 13 rotates with machine table 11. Inner spline 36 is machined into the bore of upper bearing support 13 and therefore rotates with machine table 11. Crowned teeth 41 on control shaft 18 engage spline 36 so that control shaft 18 is compelled to rotate with machine table 11. Hub blank 30 is secured to inverted cup shaped member 42, with center 40 of blank 30 coincident with the center of curvature of crowned teeth 41 on control shaft 18 and also on the center of curvature of spherical bearing member 38. Hence, hub blank 30 is also compelled to rotate with machine table 11.

The lower end 44 of control shaft 18 is slidably mounted in bore 46 of lower ball joint 48, being free to rotate or move axially therein. Lower ball joint 48 is guided by and rotatably received in bracket 20. Bracket 20 can be adjusted by the horizontal bolt 31 to any degree of radial offset from the center line of the attachment 12. With control shaft 18 adjusted concentrically with table 11, as in FIG. 5, the machine will cut straight spur gear teeth on the hub blank 30.

Control disc 14 is rotated by a separately powered worm wheel 52, the power source, being mounted firmly on lower base 15, but, control disc 14 has no effect on shaft 18 when set on center, since end 44 is freely received in lower ball joint 48.

As shown in FIG. 5, the center line 56 of control shaft 18 is on the center line 58 of attachment 12, and if control disc drive 54 were started, control disc 14 would rotate, but because machine table 12 and therefore control shaft arm shaft 56 are at rest or rotating uniformly, lower ball joint 48 merely rotates either on its spherical seat 46 or on the lower end 44 of control shaft 18, as dictated by friction.

Assume that control disc drive 54 is shut down, and the cutter shaft 60 is withdrawn radially outward and upward so cutter 21 does not touch the hub blank 30. It we then start the machine table drive, hub blank 30 and cutter 21 will begin to rotate in the desired timed relationship, but with no cutting action. By moving cutter 21 inward toward the blank, and moving it vertically in a conventional gear cutting machine manner, cutter 21 will generate straight teeth on the hub blank 30. This operation can be stopped at some appropriate time, leaving some finish stock on the tooth surfaces.

Figure 6:
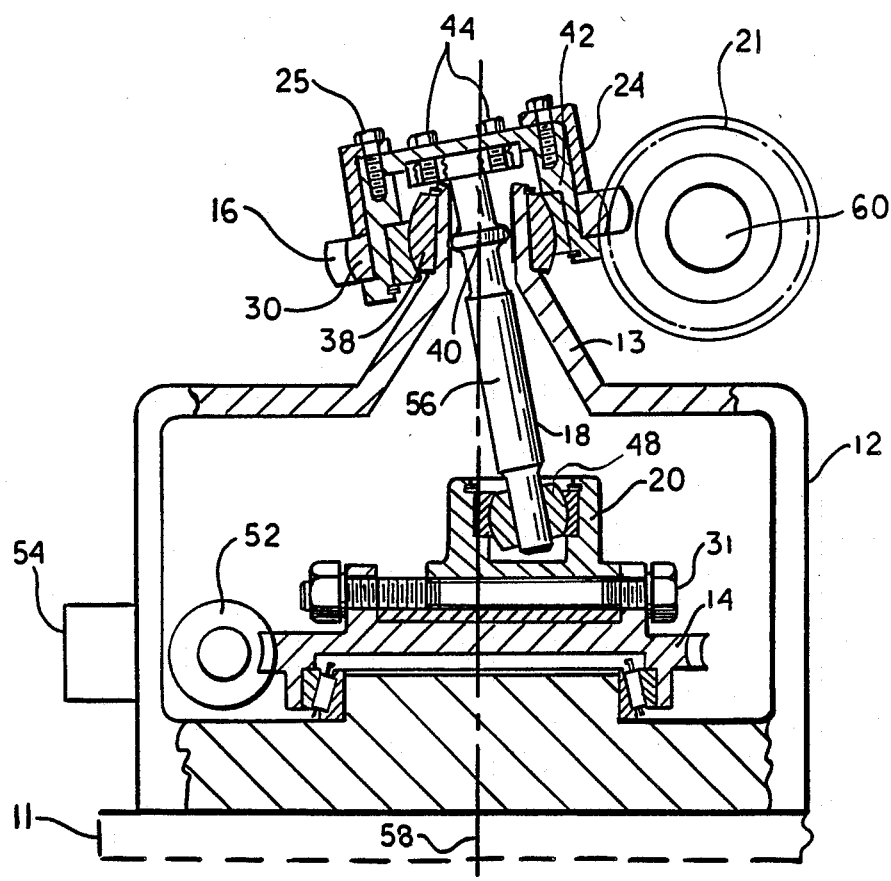
FIG. 6 is a view similar to FIG. 5 with the control shaft axis of the adapter offset to cut gear teeth self-generated as to form to operate at a predetermined range of misalignment, according to the invention.

Now referring to FIG. 6, assume cutter shaft 60 is moved radially outward and its vertical position adjusted so that the cutter axis is in the same horizontal plane as center 40 of hub blank 30. By means of adjusting screw 31, the center of lower ball joint 48 is adjusted radially outward to the position shown in FIG. 6. This tilts hub blank 30 and inverts cup assembly 42 about the center 40 of crowned teeth 41 on control shaft 18. However, control shaft 18, cup assembly 42 and hub blank 30 are still rotatably fixed to machine table 11. Control table drive 54 can now be started, causing hub blank 30 to "wobble" relative to cutter 21 at some rate different from the speed of rotation about the vertical axis of machine table 11. Cutter 21 is now fed gradually inward. Cutter 21 will begin cutting hub teeth 30 at their upper and lower ends, these cuts moving progressively toward the midplane of hub teeth 30. When cutter 21 has moved radially inward to finish teeth 16 at the midplane, the teeth will have the desired shape for optimum operation as a gear coupling. (Note that the hob cutter is not moved vertically. The "wobble" of the hub blank provides the necessary vertical feed motion to the cutter.)

The same procedure would apply for a gear shaper cutter, or finish grinding by the hob type grinder process. The teeth also may be produced by a milling cutter if the machine table 11 were indexed for each tooth, one by one.

Another advantage of this concept is that the gear cutting machine 10 on which attachment 12 is used is completely standard. No crowning attachment feature is required, since all of the necessary modifications to produce a crown are contained in the assembly described. For very small angles of misalignment (say $1\frac{1}{2}$ degrees or less) and pitch diameters less than about ten inches, the difference between the self generated tooth by this procedure, and teeth produced by other known methods described earlier in this application, is so small that, regardless of which production method is used, any irregularities between tooth curvatures as imposed by the designer, and those self generated, are so small that normal wear under service conditions will cause conventional teeth to assume the shape described in this concept. Note that this correction must be the result of wear for all conventionally machined teeth. For larger misalignment angles and larger pitch diameters, the difference becomes progressively magnified until only two teeth carry the load at a given time. This could lead to early failure, or unacceptably low limitations of load or speed.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A gear coupling for connecting two shafts adapted to be operated at a maximum angle of misalignment to one another comprising a sleeve with internal teeth and a hub with external teeth hub, said hub teeth being meshed with said sleeve teeth,
said hub teeth having been shaped by a cutting tool simulating said sleeve teeth,
said hub having a center and said center of said hub having been held in a fixed position relative to said cutting tool throughout the shaping thereof and the central axis of said hub having been moved relative to said cutting tool while being shaped relative to the central axis of said sleeve through all maximum angles of misalignment that said hub is intended to encounter in service.

2. A hub for a gear coupling for connecting two shafts adapted to be operated at a maximum angle of misalignment to one another comprising a sleeve with internal teeth and a hub having a center and a central axis with external teeth, said hub teeth being meshed with said sleeve teeth,
said hub teeth having been shaped by a cutting tool having cutting teeth simulating said sleeve teeth and the central axis of said hub having been moved about its said center while said center was held stationary while being shaped relative to the central axis of said sleeve through all maximum angles of misalignment said hub is intended to encounter in service.

3. The hub recited in claim 2 wherein said central axis of said hub was moved relative to the central axis of said cutting tool in a conical path, the apex of said conical path being disposed on a line passing through the center of the curvative of the tips of said hub teeth.

* * * * *